May 6, 1947.  J. K. WOOD  2,420,276
SUPPORT
Filed April 2, 1945  2 Sheets—Sheet 1

INVENTOR
JOSEPH KAYE WOOD.
BY
ATTORNEYS

May 6, 1947. J. K. WOOD 2,420,276
SUPPORT
Filed April 2, 1945 2 Sheets-Sheet 2
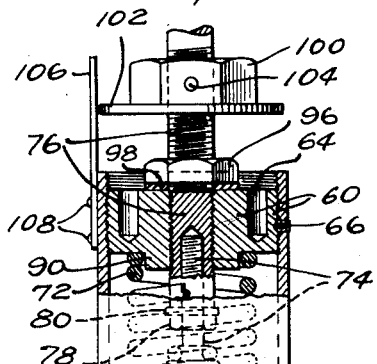
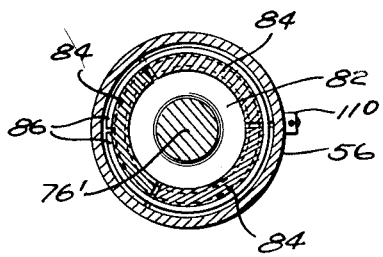
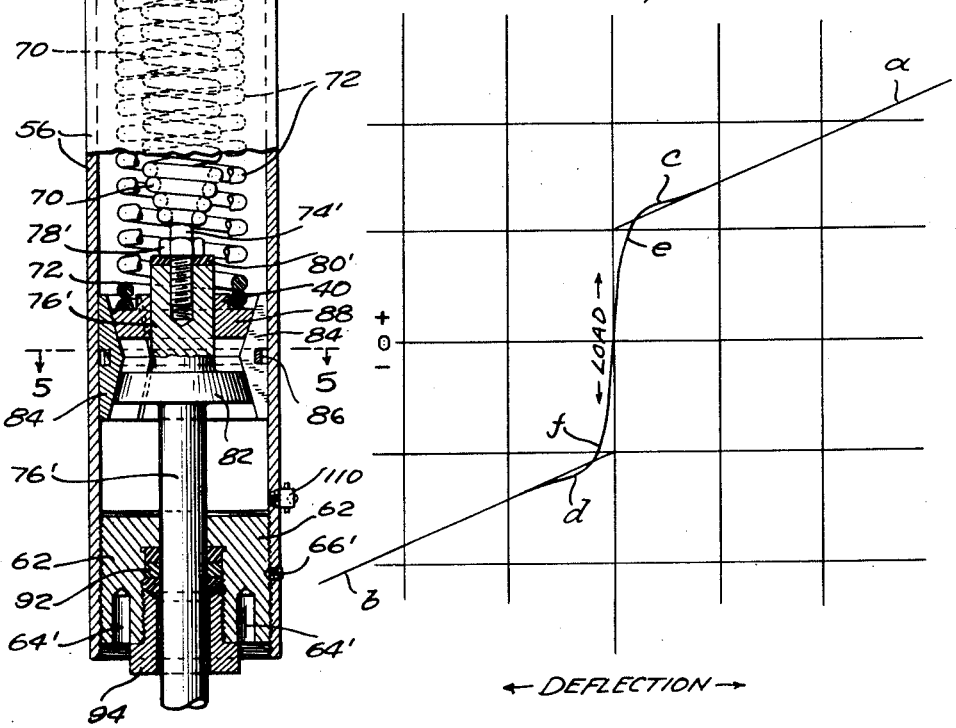
INVENTOR
JOSEPH KAYE WOOD
BY
ATTORNEYS Patented May 6, 1947

2,420,276

UNITED STATES PATENT OFFICE 2,420,276

SUPPORT

Joseph Kaye Wood, New York, N. Y., assignor to General Spring Corporation, New York, N. Y., a corporation of New York Application April 2, 1945, Serial No. 586,093

15 Claims. (Cl. 248—54)

This invention relates to the mounting and steadying of pipe lines and other parts and more particularly to a flexible mounting adapted to afford support against dynamic forces such as inertia and against vibration or other harmonic movements and at the same time to relieve stresses between the mounted parts and the supporting structures, e. g., such as may develop in pipe lines subject to temperature changes and high pressures.

I have heretofore, in my Patents 1,816,164, 1,917,135, 2,145,704, 2,208,064 and 2,256,784, disclosed hangers which are adapted to support high temperature pipe lines or other equipment so as to allow limited vertical movement but avoid vibratory vertical movement. Commercial application of these hangers has emphasized the need for practical devices to steady pipe lines and other equipment against horizontal sway and even against vertical vibratory forces where the greater expense of providing constant support throughout a substantial range of movement of the device is not a requirement.

An object of my present invention, therefore, is to provide a simple brace against swaying and whipping of piping and like equipment when subjected to vibratory forces.

In my co-pending application Serial No. 531,183, filed April 15, 1944, of which the present application is a continuation in part, I have shown a simple, compact and rugged unit embodying certain principles used also in the improved unit of the present invention but comprising separate springs, each acting only upon movement to one side of a mid-position. In this application is disclosed an even more simple, compact and rugged unit requiring only a single spring to secure substantially the same result.

In my co-pending application, Serial No. 390,415, filed April 25, 1941, of which the present application is also a continuation in part, I have shown a sway brace provided with frictional means for damping the motion of the pipe line which operates on the same principle as the friction means of the present invention. As shown in the present application, such friction means are combined in the simple single spring unit as aforementioned.

In the accompanying drawings, I have shown a preferred embodiment of my invention and an application thereof. These drawings and the following specification and description are not intended to be exhaustive or limiting of the invention but, on the contrary, are presented with a view to best explaining the invention and the principles thereof and the best manner of embodying the same so that others skilled in the art may adapt and modify the invention and may construct it in such various forms as may best be adapted for the requirements of any particular condition.

In the drawings—

Figure 4 shows another form of pipe-supporting and steadying means employing two springs and a single piston having incorporated therein friction means designed to act equally in both directions;

Figure 5 is a section on the line 5—5 of Figure 4, and

Figure 6 is a characteristic plot of force exerted on the pipe against movement of the pipe.

Figure 1:
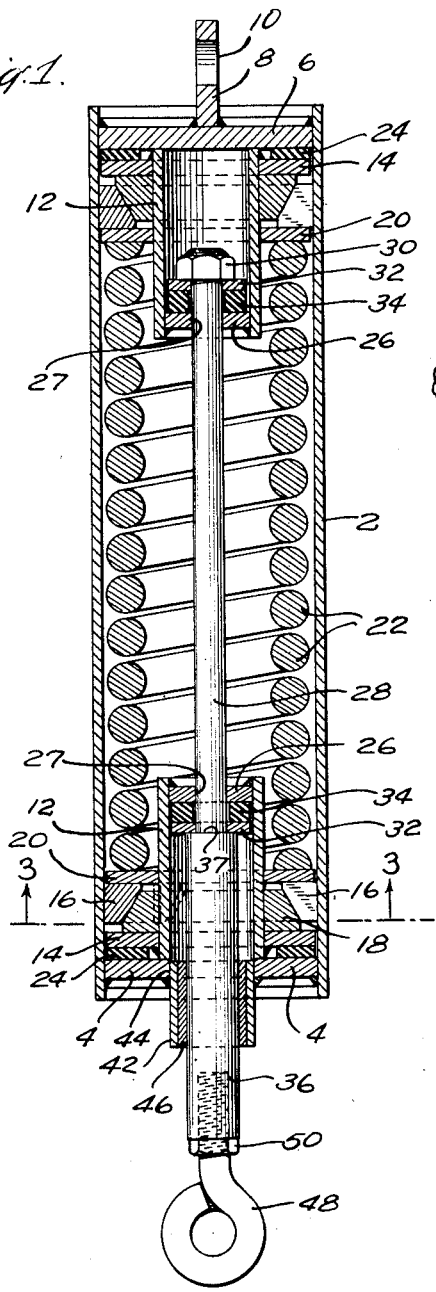
Figure 1 is a vertical section through a pipe supporting and steadying unit embodying the present invention.

In the illustrative embodiment of the invention the improved sway brace comprises a tube or cylinder 2 having abutment pieces 4 and 6 fitted therewithin and welded in place near the ends thereof, the abutment piece 6 having an eyepiece 8, provided with an eye 10, for attachment to any suitable support, welded to its outer face.

Figure 2:
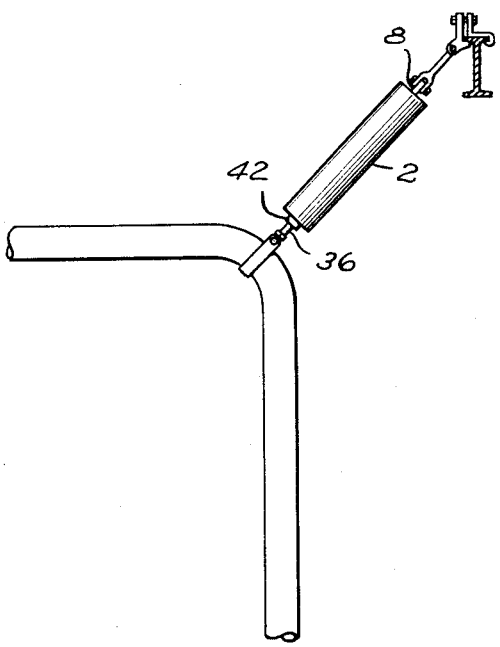
Figure 2 is a plan view of a typical pipe line showing where a brace made in accordance with the present invention will be used.
Figure 3:
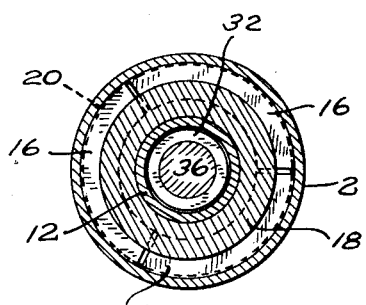
Figure 3 is a section on the line 3—3 of Figure 1 showing the construction of the friction means.

Inside the cylinder are two pistons, of substantially identical construction, located at opposite ends thereof, each piston comprising a short section of tubing 12 of sufficient length to permit substantial relative sliding or lost motion movement of the piston rod and piston. Welded to the outer face of each piston, near the base thereof, is an annular guide or flange portion 14 of approximately the inner diameter of the cylinder 2. Each piston also has, as a part thereof, a friction ring 16 which, as shown in Figure 2, comprises three segments slightly spaced from each other when the outer frictional surface of the ring is in engagement with the inner wall of the cylinder 2, this ring having a frusto-conical inner surface bearing against the outer face of a frusto-conical sleeve 18 the base of which abuts against the annular guide or flange portion 14. The wider edge of each friction ring 16 bears against a washer 20 slidable on the tube 12 and of a diameter approximating the inner diameter of the tube 2, the upper and lower washers 20 serving as abutments for the ends of the spring 22 of the unit.

From the foregoing description it will be seen that movement of either piston against the resistance of the spring 22 will cause the friction ring 16 to be expanded into frictional engagement with the inner wall of the cylinder 2 by reason of the coaction of the conical faces on the sleeve 18 and the friction ring 16.

The spring 22 is preferably under sufficient tension, when the structure shown in Figure 1 is assembled, so that it tends to maintain the two pistons just described in the positions there shown, that is, with each of the cylinders 12 of the pistons in abutting relation to its associated abutment 4 or 6. As shown, the annular guide or flange portion 14 of each piston is spaced a slight distance from the abutment engaging end of the tube 12 and a ring of cushioning material 24 is located between the annular guide portion 14 and the abutment 4 or the abutment 6. This cushioning ring may be made of any material suitable for shock absorbing and sound deadening purposes such as nylon, neoprene or especially that sold under the trade-mark "Fabreeka."

Each of the tubes 12 has welded into its end remote from the abutment engaging end a piston rod guide 26 having a central guide opening 27 through which the piston rod 28 may slide. To effect the movement of the pistons against the tendency of the spring 22 to maintain them in their abutting relations to the abutments 4 and 6, the piston rod 28, at its upper end in Figure 1, is shown as threaded and provided with a nut 30 normally resting on a washer 32 approximating the inner diameter of the tubular portion 12 of the piston, this washer in turn bearing against a cushioning ring 34 which may also be made of the same type of material as that mentioned in connection with the cushion 24. The ring 34 is located between the washer 32 and the piston rod guide 26.

Below the guide 26 in the lower piston in Figure 1 the piston rod 28 is shown as provided with an enlarged portion 36; and, bearing upon the shoulder 37 thus formed, is a second washer 32. Between this washer 32 and the lower piston rod guide 26 is a cushioning ring 34.

To provide a guideway for the enlarged portion 36 of the piston rod a short tube 42 is welded into an opening 44 in the abutment 4 and this tube is shown as having therein a bushing 46 of any suitable bushing material, e. g., bronze, "oilite," etc. The enlarged portion 36 of the piston rod is shown as extended sufficiently above and below the tube 42 and bushing 46 to provide for the maximum movement of each piston in the cylinder 2. It will be seen that the movement of the lower piston is limited both by the limitations of the compression of the spring 22 and by the amount of sliding movement of the piston rod 28 permitted before the nut 30 or the end of the piston rod 28 strikes the abutment 6. The limitation of the upper piston movement is evidently determined by the extent of the compression of the spring provided before the coils thereof are all in engagement with each other.

Like the sway brace disclosed in my co-pending application Serial No. 531,183, filed April 15, 1944, of which this application is a continuation in part, the spring action of the sway brace of the present invention is so limited that it comes to zero at the point of proper support. In other words, if the brace is intended to brace steam piping against swaying and whipping, the connection between the piping and the support is so adjusted that in the normal operating condition of the piping, each of the pistons is maintained by the spring 22 in abutting relation to the associated abutment 4 or 6, in which position there is obviously no spring loading upon the piping, even though there is a substantial spring loading on the pistons 12 and through them on the abutments 4 and 6.

To provide for adjustment of the sway brace to suit it to the particular condition of the piping in which it is desired that the spring loading be zero, a screw eye 48, which is threaded into the lower end of the enlargement 36 of the piston rod 28 and secured in its adjusted relation thereto by lock nut 50, may be screwed into or out of the enlargement 36 to secure the desired adjusted relation of the supporting unit to the piping in the operating condition thereof. Ordinarily the screw eye 48 is connected to the piping in any suitable manner and the eyepiece 8 on the abutment 6 is connected to the fixed support. It will be understood, of course, that additional adjustable connections may, if desired, be interposed, e. g., between the eyepiece 8 and the fixed support, and between the abutments 4 and/or 6 and the end of the tube 2, e. g., by threaded engagement.

The characteristic of the device just described is as shown in Figure 6. Movement of the pipe (and with it the rod 28 and pistons 12, respectively) is plotted on the abscissa and force exerted by the spring on the pistons 12, respectively (and, through them, largely on the pipe) is plotted on the vertical ordinates. The characteristic (stiffness) of the spring 22 itself is represented by the slope of the lines $a$ and $b$ in Figure 6. The characteristic of the elastic, rubber-like material 34 is curved and since it is "in series" with spring 22 the result is to introduce the slight curvature of the lines $c$ and $d$, the steeply curved lines $e$ and $f$ result from the characteristic of the elastic cushions 24 acting on the pistons 12 in opposition to the springs 22. Springs and cushions of different characteristics can, of course, be used.

This system in itself is necessarily non-harmonic, since the spring cannot overshoot the normal position, being stopped short by the abutment 4 or 6 when it returns to the normal position. When attached to a piping or other elastic system, it opposes harmonic swaying of the system as a whole because, as shown in Figure 6, the device yields to increasing forces with a smoothly increasing movement only so long as it remains on one side of the normal position. Whenever in any harmonic motion the system passes through the normal position, motion is arrested until a substantial increase in force has accumulated. The amount of pre-loading of the spring 22 can be such that forces normally encountered do not exceed this pre-loading, and therefore the piston rod 28 does not move substantially, although it can and does yield to abnormal forces which would impose dangerous stresses on the piping or other supported system.

This arrangement of spring, plungers and abutments, such that the action of at least one spring is abruptly terminated at a mid-point in the movement of the load, is claimed broadly in my continuation application, Serial Number 589,373, filed April 20, 1945.

As shown in Figures 1 and 2 this non-harmonic characteristic of the system is supplemented by friction damping means. Although various friction means are known which can be used for this purpose, the device 14—16—18—20 as shown is particularly contrived and is peculiarly adapted for use with a coil spring support or sway brace.

If the pistons 12 are designed to fit more or less snugly in the cylinder so as to exert pressure on a fluid (e. g., air or oil) within the cylinder while allowing it limited escape past the piston, e. g., as in my Patent No. 2,335,833, a further damping is secured by dashpot action. Such auxiliary damping means as the friction ring and the dashpot action will be used or omitted depending upon whether the problem is to dissipate vibrational energy of the piping, etc., or merely to avoid resonance. If such auxiliary means are not required, the piston and cylinder may be such as to act merely as guide and enclosure.

Although the device as shown is intended primarily for a sway brace or steadying support for piping not subject to thermal expansion, it will be evident that it can be used to support the weight of such apparatus, and as such will serve to damp up-and-down swaying of the pipe provided that the weight carried is within the vertical portions e—f of its characteristic as shown in Figure 6, i. e., the weight supported is less than sufficient to move the piston 12 against the initial pressure of spring 22. In such case, however, it is preferable to use two springs, e. g., as shown in my co-pending application Serial No. 531,183.

In the form of the invention shown in Figure 4 of the drawings, the sway brace comprises a tube or cylinder 56 extending substantially the full length of the sway brace and threaded at both ends for a distance sufficient to accommodate the plugs 60 and 62. These end plugs, as shown, are provided with threads which correspond to the threads of the tube and are screwed in so as to be recessed approximately ¼" from their respective ends of the tube. The plugs are provided with suitable means for receiving a wrench, for example, the drill holes 64 and 64'. In order to prevent the plugs from turning, set screws 66 and 66' are threaded through the wall of the tube or cylinder 56 and are tightened against the parts 60 and 62.

The spring group consists of opposed springs 70 and 72. In the form of the sway brace shown, the spring 70 is a tension spring and the spring 72 is a varied pitch compression spring. That is to say, different turns have different spacing from adjacent turns when the spring is sufficiently extended to separate all turns. In the case illustrated, the variation in pitch is not uniformly progressive but stepwise, i. e., different sections of the spring have different pitch but in each section the pitch is uniform. The spring 70 is advantageously formed with progressively varying "backwind" near its ends only, being of constant pitch throughout its mean length, but this is not essential and the entire operative length of the spring may be effective at all times without change. The inner tension spring 70 is formed with conical end plugs extended into bolts 74 and 74'. These bolts are in turn screwed into the larger bolts or connecting rods 76 and 76' and are secured by lock nuts 78 and 78' and lock washers 80, 80'.

The rod 76 may be a simple rod threaded at its outer end into a turnbuckle or other connection or may be attached in any other suitable manner to the fixed support. At its other end the rod 76 is threaded to screw into the end plug 60 and is drilled and tapped to receive the end bolt 74 of the tension spring 70. The rod or bolt 76', which serves as a piston rod, like the bolt 76, is threaded or provided with an eye or any other suitable connection at its outer end by which it may be connected to the pipe line and is similarly tapped and threaded at its inner end to receive the bolt 74' connected to the inner spring 70, but, near its inner end, it is specially formed with an integral frusto-conical cam member 82, which, depending upon the material used, the force of the springs, and the frictional requirements of the system, may advantageously be sloped at a 3:10 slope to provide for the best wedging or camming action to effect the expansion of the segmental friction ring 84, which, as shown in detail in Figure 5, is composed of three closely spaced segments. By a 3:10 slope I mean, e. g., a wedge having an increase in radius of 3 mm. for each 10 mm. height above the base of the slope. The angle of slope of such a wedge is approximately 16° to the axis of the piston. It is to be understood that this angle is merely the best angle under particular circumstances, and that the angle will in general be chosen to provide suitable friction by expanding the ring 84.

A loosely fitting band 86, received in grooves in the outer face of the ring 84 holds the segments in assembled relation and prevents relative longitudinal movement thereof.

Pressing against the other inner surface of the friction ring 84 but oppositely disposed in respect to the camming member 82 is a second annular frusto-conical camming member 88 having a shoulder and a short hub portion 40 to center and act as a bearing surface or abutment for the end of the compression spring 72. The part of the piston rod 76' which passes through the end plug 62 is accurately machined to provide a close bearing fit in rod guideway in said plug and packing 92 is provided which allows free motion of the piston rod 76' in a longitudinal direction while keeping the interior of the cylinder 56 sealed against leakage around the piston rod. The packing 92 is held in place by the packing gland 94 which screws into the end plug 62.

At the other end of the sway brace a nut 96, threaded upon the rod 76, is provided with a felt gasket 98, the nut 96 serving as a lock nut and, when tightened, preventing turning of the rod 76 in the plug 60. To provide means for effecting turning of the rod 76 for adjustment, a large nut 100 is screwed on the rod 76 and pinned against turning on the rod by a pin 104. A flange 102 on the nut 100 cooperates with the scale 106, e. g., of light sheet metal and attached to the tube 56 by screws 108. This scale is calibrated to show the adjustment of the bolt or rod 76.

Between the shoulder provided on the end plug 60 and the shoulder 90 on the cam member 88, is placed the compression spring 72 which, as shown, has its windings in three different pitches in three different sections. The middle section has the smallest pitch and with the tension spring providing a loading, as shown in Figure 4, these turns will be normally entirely closed. The second sections are located on either side of the middle section and the pitch of these is initially somewhat greater than the pitch of the middle section. As shown, under normal initial loading by the tension spring, these are closed to about half their relaxed spacing. The third group comprises those turns nearest the ends and these sections are wound to the greatest pitch. These groups do not go out of action by a complete closing of their spacing during any normal operation. The advantages of the employment of the varied pitch spring are more fully set forth in my co-pending application Serial No. 390,415, filed April 25, 1941, in which claims to these features of my construction have been made.

As previously explained, one purpose of my invention is to resist oscillatory movement of the pipe line, etc., and, if desired, also to provide compensating forces to regulate expansion in a pipe line. When the device is installed, the bolt 76 is attached, for example, to a girder or other fixed part of the structure and the piston rod 76' is connected to any suitable pull-off suport on the pipe line. The tension spring 70 is adjusted so as to properly initially load the compression spring 72 and the two springs will be in an equilibrium position in which they are balanced one against the other. The compression spring presses against the cam member 88 and the tension spring pulls against the piston rod 76 which is integral with the cam member 82. Thus it may be seen that the two cam members 82 and 88 are urged toward each other and thus cam the segments of the friction ring 84, which may be, for example, of phosphor-bronze, outwardly against the inner wall of the tube or cylinder 56 irrespective of any external load on the unit.

With the piston 82—84 in its innermost operating position the entire space inside of the tube or cylinder 56 may be filled with any suitable viscous liquid, such as a heavy oil, which may be added, after the unit is assembled, through the Alemite fitting 110 shown near the lower end of the tube or cylinder 56. It will thus be apparent that any motion of the friction ring 84, constituting a part of the piston, will be resisted not only by the friction of the phosphor-bronze segments 84 against the inner wall of the tube 56 but also by the dashpot action of the oil in the tube or cylinder 56, which must escape past the piston in order to equalize the pressure on both sides of the assembly as the assembly moves. As the piston assembly moves outward, or upward in Figure 4, it will suck air in through the Alemite fitting 110, which air will serve to cushion slightly the dashpot action. In order that this should not break the action of the dashpot it is desirable to have one end of the tube above the other.

In the drawings this dashpot action has been shown as occurring because of the spacing between the various parts of the piston assembly which allows leakage therethrough. It may be desired to increase this leakage and in that case holes of suitable size may be drilled through the cam members 82 and 88 to provide the desired degree of leakage.

In the operation of the form of my invention shown in Figures 4 and 5, vibrational or other movement is transmitted into the assembly through the piston rod 76' and this tends to bring about movement of the friction ring 84 back and forth in the tube or cylinder 56 and also tends to throw the springs 70 and 72 out of their balanced relation to each other.

If it is desired to change the point at which the springs balance and therefore the range of the sway brace shown in Figures 4 and 5, it is only necessary to loosen up the nut 96 at the outer end of the sway brace and turn the bolt 76 by means of the large nut 100 attached thereto and thus move it in or out with respect to the end plug 60. This adjusts the point at which the result of the springs becomes zero.

I claim:

1. A steadying support comprising, in combination, a piston cylinder having abutments located near the ends thereof, pistons and a spring interposed therebetween and normally maintaining said pistons in engagement with the respective abutments, a piston rod slidably mounted in said pistons and having thereon means for effecting a pull connection with one piston and a push connection with the other, said means being so arranged that the piston rod may slide idly through the other piston when either of the pistons is moved by its connection therewith.

2. A steadying support according to claim 1 in which shock and sound absorbing means are located between each piston and its associated abutment.

3. A steadying support according to claim 1 in which shock and sound absorbing means are located between the push and pull connections and the respective pistons.

4. A steadying support according to claim 1 which further comprises means for converting and dissipating vibrational energy as heat.

5. A steadying support according to claim 1 in which each piston comprises radially expansible friction means cooperating with the inner cylinder wall and means, carried by each piston and rendered effective by the resistance of the spring to movement of the piston, for expanding the friction means into effective frictional engagement with said cylinder wall.

6. A steadying support according to claim 1 in which each piston comprises radially movable segments of a ring having a frusto-conical inner face and having its wider edge under spring loading and expanding means for said segmental ring including a frusto-conical member engaging the inner face of said segmental ring and carried by said piston for positive axial movement against said spring, whereby the spring resistance to the axial movement of said segmental ring causes the wedging of its segments into frictional engagement with the inner wall of the cylinder.

7. A steadying support comprising, in combination, a cylinder, a piston therein having, as a part thereof, radially expansible friction means shaped to cooperate with the inner cylindrical wall, a spring resisting movement of said piston in said cylinder, a piston rod and means carried by said piston rod and rendered effective by the resistance of said spring to movement of the piston, for expanding the friction means into effective frictional engagement with said cylinder wall.

8. A steadying support according to claim 7 in which the friction means comprises radially movable segments of a ring having a frusto-conical inner surface and said expanding means comprises a frusto-conical member engaging the inner surface of said segmental ring and carried by said piston for positive axial movement against said spring, whereby the spring resistance to the axial movement of the piston causes the wedging of the ring segments into frictional engagement with the inner wall of the cylinder.

9. A steadying support according to claim 7 in which the friction means comprises a segmental ring having its inner surface tapered from a relatively thick middle section of said ring toward each relatively thin edge and in which said expanding means comprises opposed frusto-conical members engaging respectively the two frusto-conical inner surfaces of said ring to convert axial forces from opposite directions respectively to radial pressure on the segments of said ring to increase the friction thereof on the inner cylinder wall, and in which there are opposed spring means arranged to urge one said frusto-conical member respectively toward said middle section of, and into spreading engagement with, said segmental ring.

10. A steadying support according to claim 7 in which the ends of said cylinder are sealed, the piston provides narrow passages therethrough and the cylinder is filled with a viscous lubricant adapted to flow with a substantial resistance through the passages in the piston.

11. A steadying support according to claim 7 in which the friction means comprises a segmental ring having its inner surface tapered from a relatively thick middle section of said ring toward each relatively thin edge and in which said expanding means comprises opposed frusto-conical members engaging respectively the two frusto-conical inner surfaces of said ring to convert axial forces from opposite directions respectively to radial pressure on the segments of said ring to increase the friction thereof on the inner cylinder wall, opposed springs urging said frusto-conical members respectively into spreading engagement with said segmental ring and a connection between one of said frusto-conical members and the supported part adapted to transmit vibratory forces thereto axially in either direction.

12. A sway brace for a pipe line comprising a cylinder having a closed end, a piston in the cylinder, said piston comprising a segmental ring adapted to be radially expanded into frictional engagement with the cylinder wall, a spreader by which said segments are spread into said frictional engagement by an axial force, a piston rod connecting said piston and a pair of concentric springs connected between said rod and the closed end of the said cylinder, said springs being respectively tension and compression springs and the forces of said springs being adjustable whereby to set the point of equilibrium.

13. A pipe line brace adapted to absorb vibratory energy which comprises a connection to a fixed anchor, a connection to the pipe line, friction means between the two connections and spring means acting between said two connections with reaction against the friction means to increase the frictional pressure.

14. A steadying support according to claim 1 in which the push connection comprises a shoulder on said piston rod and in which the pull connection comprises a head on said piston rod and each piston comprises a central tubular portion of sufficient length to provide for the idle or lost motion sliding of the head and shoulder, respectively, of the piston rod therein.

15. A steadying support according to claim 1 in which each piston comprises a central tubular portion of sufficient length to provide for the idle or lost motion sliding of the piston rod therein, said pistons being entirely enclosed within said cylinder.

JOSEPH KAYE WOOD.

REFERENCES CITED

The following references are of record in the file of this patent:

UNITED STATES PATENTS

| Number | Name | Date |
| --- | --- | --- |
| 2,215,238 | Wert | Sept. 17, 1940 |
| 2,335,833 | Wood | Nov. 30, 1943 |
| 2,335,834 | Wood | Nov. 30, 1943 |